Patented June 26, 1951

2,558,042

UNITED STATES PATENT OFFICE 2,558,042

PROTECTIVE COATING COMPOSITION FOR HAMS

Ralph T. K. Cornwell, Rosemont, Pa., assignor to American Viscose Corporation, Wilmington, Del., a corporation of Delaware No Drawing. Application December 7, 1948, Serial No. 64,048

4 Claims. (Cl. 106—194)

This invention relates to the art of preserving meat, fruit and other animal or vegetable products which are subject to bacterial and mold attack.

It has been proposed previously to coat various articles of food with gelatine in order to preserve them against deterioration on exposure to the air. Gelatine is edible and the skin may be left on articles of food when they are eaten. However, gelatine is not satisfactory as a coating for meat or the like when it is desired to incorporate in the coating extraneous agents, for example, agents having bactericidal properties. Some of these agents may be harmless to the health of human beings, but they invariably possess a disagreeable, bitter taste, and, when they are present, the protective coating must be removed before the foodstuff is eaten. The disadvantage of gelatine as a coating material under such conditions is that the adhesive properties of gelatine are more pronounced than the cohesive properties thereof, and, therefore, when it is attempted to remove the gelatine coating by pulling, it tears very readily and has to be more or less picked off piece by piece. Moreover, gelatine coatings are relatively soft and do not offer good resistance to abrasion such as the coated articles are subjected to during packaging and transportation.

According to the present invention, these disadvantages are avoided and meat, fruit and like products, for example oranges, hams, etc., are provided with a firm, tough, abrasion-resistant protective coating which is resistant to bacterial and mold attack, and is readily strippable from the ham when the latter is to be prepared for consumption. In accordance with the invention, all parts of the surface of a ham or the like are provided with a continuous, readily strippable air-tight tough film comprising a film-forming water-soluble cellulose ether and a water-miscible salt, which may be water-soluble or water-dispersible, and characterized by antibacterial and anti-mold properties, for instance, sodium acid sulfite, sodium propionate, propyl gallate, dialkyl benzyl ammonium chloride, such as diethyl or dimethyl benzylammonium chloride, etc. by dipping the article of food into a homogeneous aqueous medium containing the ether and salt, allowing the excess to drain off, and drying the coated article.

In the preferred embodiment, the cellulose ether is hydroxyethyl cellulose, but other water-soluble cellulose ethers, such as methyl cellulose, ethyl cellulose, and water-soluble cellulose ethers of glycollic acid or glycollic acid salts, such as the ammonium, sodium and potassium salts, may be used.

One of the advantages of the invention lies in the fact that the protective film is resistant to abrasion and remains firmly fixed to the surface of the ham during storage and transportation and under all conditions where it is not exposed to the direct action of water, but has cohesive properties greater than its adhesive properties so that it does not tear easily when subjected to a pulling force and can be readily stripped from the article at will. The tough, continuous film can be peeled off very readily in the form of long strips which do not tend to break into fragments, leaving the surface of the article free of adherent particles of the coating. It may be washed off.

The ham or other article can be sterilized before or after applying the protective coating, when such sterilization is desirable or practicable.

The coating composition is made by stirring the water-soluble cellulose ether and water-soluble or dispersible salt into sufficient water to make a homogeneous composition of the desired consistency. The coating composition may be applied in any way, but when the article to be coated is a ham or other article having an irregular contour, the coating is preferably applied by dipping the article in the aqueous coating medium and allowing the solution to drain off. The article may be dipped into the coating composition as often as needed to provide a coating of the required thickness. The concentration of water-soluble cellulose ether in the aqueous coating composition may vary but is generally in the range of from 2 to 10% by weight, based on the total weight of the composition.

It will be obvious that any water soluble or water dispersible bactericidal agent may be incorporated with the cellulose ether to form the coating composition, the specific salts mentioned herein being cited as illustrative only. The proportion of the bactericidal agent in the coating composition will vary with the particular agent used, but is generally from 1 to 3%.

I claim:

1. A film-forming composition for use as a protective coating for hams and other articles of food comprising an aqueous solution of hydroxyethyl cellulose and 1 to 3% of sodium acid sulfite.

2. A film-forming composition for use as a protective coating for hams and other articles of food comprising a homogeneous aqueous medium containing a water-soluble cellulose ether and 1 to 3% of sodium acid sulfite.

3. A film-forming composition for use as a protective coating for hams and other articles of food comprising a homogeneous aqueous medium containing 2 to 10% of a water-soluble cellulose ether and 1 to 3% of sodium acid sulfite.

4. A film-forming composition for use as a protective coating for hams and other articles of food comprising an aqueous solution of 2 to 10% hydroxyethyl cellulose and 1 to 3% sodium acid sulfite.

RALPH T. K. CORNWELL.

REFERENCES CITED

The following references are of record in the file of this patent:

UNITED STATES PATENTS

| Number | Name | Date |
|---|---|---|
| 971,799 | Stevenson | Oct. 4, 1910 |
| 2,340,072 | Medl | Jan. 25, 1944 |
| 2,352,611 | Bowers | July 4, 1944 |
| 2,362,761 | Medl | Nov. 14, 1944 |
| 2,429,404 | Dixon | Oct. 21, 1947 |

OTHER REFERENCES

"Research Medical Progress Report No. 4," page 1, Committee on Medical Research of the Office of Scientific Research and Development, February 4, 1944, OE Ncmr 334.